June 12, 1962  B. DUBSKÝ ETAL  3,039,044
ELECTROMAGNETIC DEVICE FOR MEASURING PRESSURE
Filed Oct. 3, 1957

INVENTORS
Bořivoj Dubský, Oldřich Straka
BY

United States Patent Office 3,039,044
Patented June 12, 1962

3,039,044
ELECTROMAGNETIC DEVICE FOR MEASURING PRESSURE
Bořivoj Dubský and Oldřich Straka, Prague, Czechoslovakia, assignors to Vyzkumny a zkusebni letecky ustav, Letnany, near Prague, Czechoslovakia
Filed Oct. 3, 1957, Ser. No. 688,008
Claims priority, application Czechoslovakia Oct. 6, 1956
5 Claims. (Cl. 323—90)

The present invention relates to an electromagnetic apparatus for measuring and is based on the utilization of the magnetic properties of ferromagnetic materials.

Devices for the measurement of pressures vary according to the purpose for which they are used. A device of this type is for example a micro pressure gauge or micromanometer.

The known micro-manometers, which are used in aerodynamic laboratories and similar establishments, utilize usually the difference between the levels of a liquid in vessels for measuring pressure. This difference of levels is read either directly or by means of various optical methods. Apart from these micro-manometers there also exist the so-called bell micro-manometers, which by means of so-called bells transform a pressure difference into a force which is measured by weighing.

All present-day micro-manometers have, as a rule, a limited range of measurements, that is, they are adapted to measure either very low pressures and cannot therefore be used for measuring medium and high pressures or vice versa. Moreover, accurate instruments are very intricate and consequently costly to manufacture.

The main feature of the apparatus for measuring pressure according to the present invention resides in the fact that the pressure difference which is to be measured is transformed by means of diaphragms or pressure vessels into a ferro-magnetic twist of a torsional body. Further, the ferromagnetic torsional body is cylindrically magnetised by an alternating current so that, when it is twisted, the cylindrical magnetic field is deformed to have a component in the direction of the axis of the torsional body, and that component induces an electromotive force proportional to the twist of the rod in a pick-up coil fitted on the rod. Thus, such electromotive force can be measured and is a function of the pressure difference.

The apparatus for measuring pressure according to the present invention is very simple in production and may be used for measurements within a very large range of pressures. When the invention is applied for example to a micro-manometer, the same apparatus may be used for measuring pressures within the range from 0.0001 mm. water column up to 1000 mm. water column. The apparatus permits remote reading of the measured value and may be used preferably as a feeler for controlling the pressure or amount of gas flowing in a pipe-line.

With only minor modifications, the apparatus may serve also as a leveling altimeter, anemometer or sensitive technical scales.

The accompanying drawing diagrammatically shows, by way of example, two embodiments of the invention.

Figure 1:
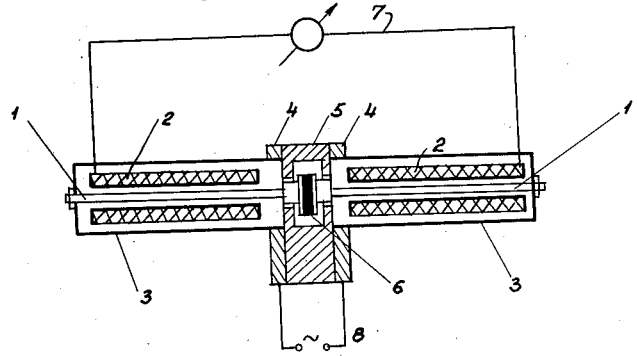
FIG. 1 shows the arrangement of a micro-manometer in longitudinal section.
Figure 2:
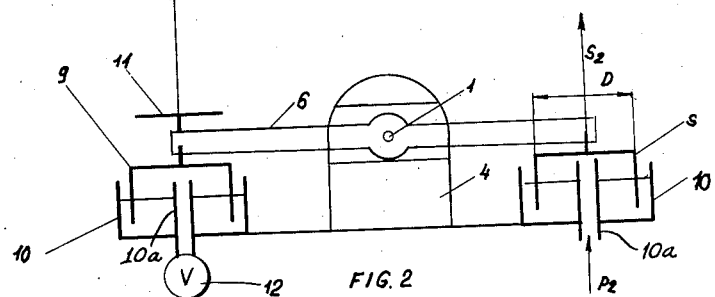
FIG. 2 is a diagrammatic side-view of the micro-manometer in a plane at right angles to the sectional view of FIG. 1.

Referring to FIGS. 1 and 2, it will be seen that the micro-manometer embodying the invention comprises a torsional rod or body 1 of a ferromagnetic material. The torsional body 1 is surrounded by pick-up coils 2, and is conductively secured, at its opposite ends, to the outer end walls of casings 3. The casings 3 are of a ferromagnetic material and have metallic flanges 4 at their inner or adjacent ends. Inserted between the two flanges 4 is an insulating inlay 5. A double-armed lever 6 is secured, at its center, to the torsional rod or body 1 within the inlay 5, and bell-shaped members 9 are suspended from the opposite ends of lever 6 and open downwardly into vessels 10 which contain bodies of liquid having the members 9 immersed therein (FIG. 2). Conduits 10a open upwardly into the bell-shaped members 9 and conduct the pressures $P_1$ and $P_2$ having a difference in values which is to be determined.

Figure 3:
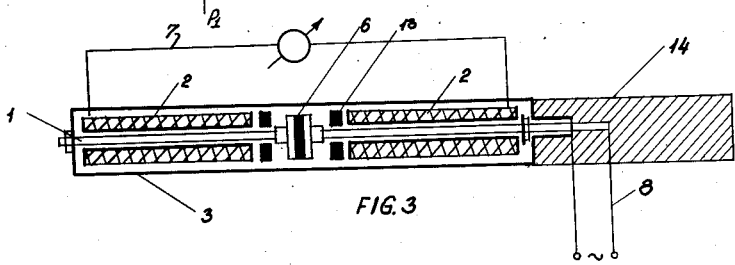
FIG. 3 shows in a longitudinal section an apparatus according to the invention used as an anemometer.
Figure 4:
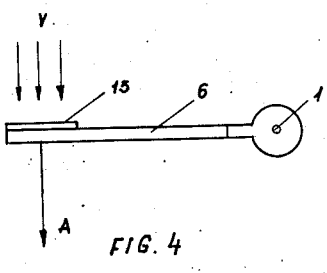
FIG. 4 is a side elevational view of the anemometer according to FIG. 3.

If the apparatus is used as a levelling altimeter, the conduit 10a leading to one of the vessels 10 is provided with a closing valve 12. A bowl or tray 11 is mounted at one end of the lever 6. The torsional body 1 is cylindrically magnetized to saturation by an exciting circuit 8 which includes a source of alternating current, and conductors connected between that source and the flanges 4 so that the alternating current flows through the body 1 by way of the casings 3, and the coils 2 are connected to a pick-up circuit 7. In the case of an anemometer according to FIGS. 3 and 4, a single casing 3 is connected at one end with an insulating holder 14. The torsional body 1 of FIGS. 3 and 4 is also surrounded by coils 2 and is supported in its central portion in bearings 13. A plate 15 subjected to the fluid flow V is secured to one end of the arm 6 which is rigidly connected to the torsional body 1. The coils 2 are again connected to the pick-up circuit 7 and the torsional body 1 is cylindrically magnetized by the exciting circuit 8 which includes a source of alternating current connected to the adjacent ends of the body 1 and the casing 3 which are insulated from each other by the holder 14 so that the alternating exciting current flows successively along the casing 3 and the body 1 from and to the ends carried by holder 14.

The operation of the micro-manometer is apparent from FIGS. 1 and 2. Underneath the bell-shaped members 9 there prevail pressures $p_1$ and $p_2$, the difference of which has to be measured. One of the two pressures may be barometric pressure. The micro-manometer serves then for measuring the overpressure or under-pressure of an unknown pressure with respect to barometric pressure.

The two pressures produce forces $S_1$ and $S_2$ acting upwardly against the member 9, respectively, said forces being proportional to the two pressures $p_1$ and $p_2$ and to the horizontal areas of the members 9

$$\left(\frac{\pi p^2}{4}\right)$$

These forces produce a torque in the torsional body 1 by way of the lever 6, said torque, being proportional to the measured pressure difference $(p_1-p_2)$.

When alternating current is introduced through the circuit 8 to the flanges 4, an alternating cylindrical magnetic field is generated in the torsional body 1, said cylindrical magnetic field being deformed helically, upon twisting of the body, so as to have a component in the direction of the longitudinal axis of body 1 which induces an electromotive force in the coils 2, such electromotive force being proportional to the twist and therefore also to the measured pressure difference. This electromotive force is picked up by means of the pick-up circuit 7. The pick-up circuit may be connected to a measuring or registering apparatus or to a control or signalling device.

The liquid in the vessels 10 separates the measured pressure $p_1$ or $p_2$ acting under the bell-shaped members from the outer atmospheric pressure. The range of measurement may be enlarged simply by placing weights on the bowl or tray 11. The bowl 11 may serve also for calibrating the micro-manometer by means of a set of known weights.

If a bowl 11 is suitably arranged at each and of the arm 6, the apparatus may be used as an accurate and sensitive balance (analytical or micro-balance) or as the weighing member for similar balances.

When the micro-manometer according to FIGS. 1 and 2 is provided with only one vessel 10, the supply tube 10a of which has a closing valve 12, the device may be used as a levelling altimeter for measuring small differences of height levels in geodetic surveying.

At a known or basic height $H_1$, the valve 12 is closed so that in the single bell-shaped member 9 a pressure corresponding to this height will prevail. Since the same pressure also acts above the bell-shaped member 9 the torsional body 1 is not subject to any twist. When the whole device is now transferred to a place having an unknown height $H_2$, a pressure corresponding to this unknown height will exist above the bell-shaped member 9 whereas inside (below) the bell-shaped member 9 the original pressure will be present. The torsional body 1 is subject to a twisting stress by the difference between these two pressures which is proportional to the difference between the original height and the unknown height, and an electromotive force is induced in the coils 2 which is proportional to the twisting stress and is picked up by the circuit 7.

In the anemometer of FIGS. 3 and 4, the torsional body 1 is subject to a twisting stress by the aerodynamic force A which is exerted against the plate 15 by an air current having a velocity V. The aero-dynamic force is transmitted from the plate 15 by the arm 6 to the torsional body 1 in the form of a twisting stress. As the force A and therefore also the torque twisting the torsional body 1 are proportional to the velocity V of the air current, the electromotive force induced in the coils 2 and picked up by the pick-up circuit 7 is proportional to this velocity and the device can therefore be used as an anemometer. When large forces (pressures or velocities) have to be measured, the bearings 13 supporting the torsional body 1 prevent the body from being bent.

The device for measuring pressures according to the present invention has an extremely wide use. After simple adjustments, as previously described it may be employed for measuring low pressures (micro-manometer), for measuring differences in level or height (levelling altimeter), for measuring the velocity of air-currents (anemometer), for exact weighing and the like. In spite of the simplicity of the device which makes it extremely simple to manufacture and therefore cheap, it has a relatively high degree of exactness and sensitivity.

We claim:
1. An electromagnetic device for measuring pressures, comprising an elongated, ferromagnetic torsional body, pick-up coils surrounding said torsional body, ferromagnetic casing means surrounding said torsional body and coils, means fixing the opposite ends of said torsional body, a lever fixed to said torsional body intermediate the opposite ends of the latter so that angular displacement of said lever produces a torsional stress in said body, means sensitive to the pressure to be measured for exerting a force on said lever tending to angularly displace the latter, magnetizing means conducting an exciting alternating current along said ferromagnetic casing means in one longitudinal direction and along said torsional body in the opposite longitudinal direction to cylindrically magnetize the latter so that, in response to torsional stressing of the body, the cylindrical magnetization of the latter is deformed to provide a component in the direction of the longitudinal axis of said torsional body which induces an electromotive force in said pick-up coils, and a pick-up circuit connected to said coils and through which a current is made to flow by said electromotive force which is proportional to the pressure to be measured, the conducting of said exciting alternating current along said ferromagnetic casing means also serving to magnetize the latter and to prevent the establishment of parasitic magnetic fields therein as a result of the magnetic field of said torsional body and external magnetic fields.

2. An electromagnetic device as in claim 1; wherein said casing means includes two coaxial, spaced apart casings having flanges at their adjacent ends and end walls at their other ends which are conductively secured to said ends of the torsional body and form said means fixing the opposite ends of the torsional body, and an insulating inlay between said flanges; and wherein said magnetizing means includes a source of said exciting alternating current and conducting means between said source and said other ends of the casings so that said current flows along one of said casings toward an end of said torsional body and then along the latter in the opposite direction before returning to the source along the other casing.

3. An electromagnetic device as in claim 1; wherein said lever has two oppositely directed arms which are subjected to different forces characteristic of two different pressures so that the current in said pick-up circuit represents the difference between said pressures.

4. An electromagnetic device as in claim 1; wherein said casing means includes a single casing coaxial with said elongated torsional body and having a wall at one end which is conductively secured to the adjacent end of said torsional body, and said means fixing the opposite ends of the torsional body includes an insulating holder secured to the other end of said single casing and to the end of said body adjacent said other end of the casing; and wherein said magnetizing means includes a source of said exciting alternating current and conducting means between said source and the ends of said casing and torsional body secured to said insulating holder so that the exciting current flows in opposite directions along the entire lengths of the torsional body and casing, respectively.

5. In combination in an electromagnetic device, an alongated ferromagnetic member, pick-up coil means surrounding said member, ferromagnetic casing means surrounding said member and said coils and rigidly supporting at least one end of said member, pressure-responsive means fixedly secured to said member intermediate the ends thereof for exerting a torsional force thereon, magnetizing means including said member and said casing means for conducting an energizing current through said casing means in one direction and through said member in the opposite direction to magnetize said casing means as well as said member so that parasitic magnetic fields resulting from the magnetic field of said member and external magnetic fields are avoided in said casing means, and pick-up circuit means connected to said pick-up coil means for indicating the torsional deformation of said member.

References Cited in the file of this patent
UNITED STATES PATENTS
2,511,178    Roters _____ June 13, 1950
2,643,367    Cruzan _____ June 23, 1953

OTHER REFERENCES
"Principles of Electric and Magnetic Fields," Boast, Harper and Brothers, 1948, pages 220–231.